(12) United States Patent
Usami

(10) Patent No.: US 7,154,844 B2
(45) Date of Patent: Dec. 26, 2006

(54) OPTICAL INFORMATION MEDIUM WITH RECORDING LAYER THAT IS PREVENTED FROM BEING EXPOSED

(75) Inventor: Yoshihisa Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 611 days.

(21) Appl. No.: 10/456,550

(22) Filed: Jun. 9, 2003

(65) Prior Publication Data

US 2003/0227863 A1 Dec. 11, 2003

(30) Foreign Application Priority Data

| Jun. 7, 2002 | (JP) | ............................. 2002-166814 |
| Jun. 7, 2002 | (JP) | ............................. 2002-166815 |
| Jun. 7, 2002 | (JP) | ............................. 2002-167430 |

(51) Int. Cl.
   *G11B 7/257* (2006.01)

(52) U.S. Cl. ...................................... 369/286

(58) Field of Classification Search ................ 369/283, 369/286, 288; 428/64.1, 64.2, 64.4, 64.7, 428/65.2
   See application file for complete search history.

(56) References Cited

U.S. PATENT DOCUMENTS

| 4,920,359 | A | * | 4/1990 | Arai et al. .................. 346/137 |
| 5,382,460 | A | | 1/1995 | Onagi et al. |
| 5,966,369 | A | * | 10/1999 | Walters et al. .............. 369/286 |
| 5,982,740 | A | | 11/1999 | Schwartz |
| 5,989,777 | A | | 11/1999 | Lamotte et al. |
| 6,238,764 | B1 | | 5/2001 | Usami |
| 6,249,509 | B1 | * | 6/2001 | Hirata et al. ............. 369/275.5 |
| 6,312,547 | B1 | * | 11/2001 | Fujimori et al. ............ 156/242 |
| 6,743,527 | B1 | * | 6/2004 | Hisada et al. ............ 428/846.9 |

FOREIGN PATENT DOCUMENTS

| EP | 0 408 763 A1 | 1/1991 |
| EP | 0 874 360 A2 | 10/1998 |
| EP | 1 202 264 A2 | 5/2002 |

* cited by examiner

*Primary Examiner*—Angel Castro
(74) *Attorney, Agent, or Firm*—Sughrue Mion, PLLC

(57) ABSTRACT

The invention provides an optical information recording medium comprising a substrate, an optional reflective layer, a recording layer, a barrier layer, an adhesive layer, and a cover layer in this order. In the first embodiment, the barrier layer covers the surface and the outer and/or inner peripheral end edge surfaces of the recording layer, the inner and/or outer peripheral portions of the substrate and the cover layer adheres to each other in at least partial region thereof via the adhesive layer, and the maximum length of this region in the radial direction is 0.4 mm or more. In the second embodiment, outer and/or inner peripheral end edge portions of the reflective layer extend past the corresponding peripheral end edge portion or portions of the recording layer, and the barrier layer adheres to the reflective layer's extended peripheral edge region.

8 Claims, 5 Drawing Sheets

OPTICAL INFORMATION MEDIUM WITH RECORDING LAYER THAT IS PREVENTED FROM BEING EXPOSED

CROSS-REFERENCE TO RELATED APPLICATION

This application claims priority under 35 USC 119 from Japanese Patent Application Nos. 2002-166814, 2002-166815, and 2002-167430, the disclosures of which are incorporated by reference herein.

BACKGROUND OF THE INVENTION

1. Field of the Invention

The present invention relates to a recordable optical information recording medium where information can be recorded and reproduced with laser beams having a predetermined wavelength.

2. Description of the Related Art

Conventionally, an optical information recording medium (optical disk) capable of recording information only once with laser beams is known. This optical disk is also called a CD-recordable (CD-R) and typically has, on a transparent disk substrate, a recording layer made of an organic dye, a reflective layer made of a metal such as gold, and a protective layer (cover layer) made of a resin. The CD-R is irradiated with near-infrared laser beams (usually laser beams having a wavelength in the vicinity of 780 nm), the irradiated region of the recording layer absorbs the beams, and the temperature thereof increases, whereby physical or chemical changes occur (e.g., forming pits) to change the optical characteristics in that region, and thereby information is recorded on the CD-R. This information is read (reproduced) by irradiating the CD-R with a laser beam having a wavelength identical to those of the laser beams used in recording, and detecting a difference in reflectance between the region of the recording layer having changed optical characteristics (recording region) and the unchanged region (unrecorded region). This CD-R is advantageous in that it can be played back on commercial CD players, and in recent years its demand is increasing with the spread of personal computers.

Additionally, there is a demand for an optical recording medium having higher recording density. In response to this demand, an optical disk called a digital versatile disk-recordable (DVD-R) was proposed (for example, see "Nikkei New Media", Extra Volume "DVD", published in 1995). This DVD-R is structured such that usually, two disks each having a recording layer containing an organic dye, a reflective layer and a protective layer laminated in this order on a transparent disk substrate having a guide groove (pre-groove) for the tracking of laser beam whose width (0.74 to 0.8 μm) is no more than half of the groove width of CD-R are stuck, with the recording layer inside, or the above-described substrate disk and a protective substrate disk having a shape identical with the disk are stuck, with the recording layer inside. Information is recorded on the DVD-R and reproduced from the DVD-R by irradiating visible laser beams (usually, laser beams having a wavelength in the range of 630 to 680 nm) and the DVD-R enables higher density recording than CD-R.

In recent years, networks such as the Internet, as well as high-vision TVs, are rapidly increasing in use and popularity. Further, High Definition Television (HDTV) broadcasting has already been initiated. Considering these circumstances, there is a need for a high-capacity recording medium capable of recording image information inexpensively and easily. DVD-R fulfils this need satisfactorily, but there is an increasing demand for even higher capacity and higher density, and a recording medium capable of dealing with this demand needs to be developed. Accordingly, a high capacity recording medium capable of high-density recording with light of a shorter wavelength than that used for DVD-Rs is under development. In particular, the recordable optical information recording media capable of recording information only once are used more and more frequently for backup or long-term storage of large-capacity information, and thus there is a strong demand for further development.

An optical information recording medium intended to be used in recording using light passed through a lens having a high NA suitable for high-density recording has been disclosed. This optical information recording medium has, on a substrate, in the following order, a reflective layer, a recording layer and a cover layer thinner than the substrate. Additionally, a method of recording and reproducing information is disclosed, wherein laser beams are irradiated onto the recording medium from the cover layer to the reflective layer. The laser beams have a short wavelength of no more than 550 nm. As the dye of the recording layer of such an optical information recording medium for use with laser beams having the above-described short wavelength, porphyrin compounds, azo dyes, metal azo dyes, quinophthalone dyes, trimethine cyanine dyes, dicyanovinyl phenyl skeleton dyes and coumarin compounds have been proposed (e.g., Japanese Patent Application Laid-Open (JP-A) Nos. 4-74690, 7-304256, 7-304257, 8-1271705, 11-53758, 11-334204, 11-334205, 11-334206, 11-334207, 2000-43423, 2000-108513, 2000-149320, 2000-158818, 2000-228028 and 2001-146074). It is easy for those skilled in the art to anticipate that compounds other than those described above can also be used in principle as the dye of the recording layer, insofar as the compounds can absorb laser beams used in recording. Proposed colors for recording and reproduction laser beams include blue-violet (wavelength of 405 or 410 nm), blue (wavelength of 430 or 488 nm) or blue-green (wavelength of 515 nm).

Generally, optical information recording media capable of recording and reproducing information using laser beams having a short wavelength have, for example, a reflective layer, a recording layer, a barrier layer, a tackifier or adhesive layer and a cover layer provided on a substrate in this order, which is different in layer structure from that of a CD-R and a DVD-R. Accordingly, the laser irradiation direction of this recording medium is opposite to that of a CD-R and a DVD-R, and layer peeling not problematic in CD-Rs or DVD-Rs may be problematic in this recording medium. Accordingly, strong adhesion between the respective layers is required. However, the layers are constituted such that an organic material (the recording layer and the like) is adjacent to inorganic materials (the reflective layer, the barrier layer, and the like), thus generating easily peelable interfaces. Therefore, sufficient adhesion cannot be obtained in certain cases and there is a need for further improvement. Due to this layer structure, the recording layer, particularly the outer peripheral edge portion thereof, is exposed to the outside, and thus shelf life may deteriorate due to atmospheric temperature and humidity.

In the above-described optical information recording medium used in an optical recording system utilizing a blue-violet laser and high NA pickup, the cover layer through which the laser beams pass is preferably thin so as to adjust the focus of an object lens having high NA. A thin film is used as the cover layer and bonded via an adhesive or tackifier onto the entire surface of the recording layer. The thickness of the cover layer including an adhesive or tackifier layer formed by curing the adhesive or tackifier is usually about 10 μm, but varies according to the wavelength of the irradiated laser or NA, The cover layer constitutes a surface through which light passes (light incidence surface) as described above, so that if the cover layer cannot adhere uniformly to the recording layer, swelling or warping appears on the surface, which lowers the reflectance due to scattering of incident light. This results in failure to achieve satisfactory recording characteristics.

Therefore, there is a need for an optical information recording medium having strong adhesion between layers, excellent shelf life and stable recording and reproduction characteristics.

Also, there is a need for an optical information recording medium including a cover layer which has high surface uniformity (smoothness) of a light incidence surface and having excellent recording characteristics.

SUMMARY OF THE INVENTION

A first aspect of the invention is to provide a disk-shaped optical information recording medium comprising a substrate, a recording layer, a barrier layer, a tackifier or adhesive layer, and a cover layer, in this order, each of which has a central hole, and where information is recorded to the medium and reproduced from the medium by irradiating laser beams thereon from the cover layer side, wherein the barrier layer covers a surface of the recording layer, and at least one of an outer peripheral end edge surface and an inner peripheral end edge surface of the recording layer; at least one of inner peripheral portions and outer peripheral portions of the substrate and the cover layer adhere to each other in at least partial region thereof via the tackifier or the adhesive layer; and the maximum length of the partial region in the radial direction is 0.4 mm or more.

A second aspect of the invention is to provide a disk-shaped optical information recording medium comprising a substrate, a reflective layer, a recording layer, a barrier layer, a tackifier or adhesive layer, and a cover layer, in this order, each of which has a central hole, and where information is recorded to the medium and reproduced from the medium by irradiating laser beams thereon from the cover layer side, wherein the reflective layer is larger than the recording layer so that at least one of an outer peripheral edge portion and an inner peripheral edge portion of the reflective layer extends past the corresponding peripheral edge portion or portions of the recording layer, and the barrier layer adheres to the reflective layer's extended peripheral edge region; at least one of the inner peripheral portions and the outer peripheral portions of the substrate and the cover layer adhere to each other in at least partial region thereof via the tackifier or the adhesive layer; and the maximum length of the partial region in the radial direction is 0.4 mm or more.

A third aspect of the invention is to provide an optical information recording medium comprising a substrate, a recording layer and a cover layer in this order, where information is recorded to the medium and reproduced from the medium by irradiating laser beams thereon from the cover layer side, wherein a cover layer surface abutting a recording layer surface has a central line average roughness (Ra) of 0.1 μm or more, and at least a part of each of inner and outer peripheral edge portions of the cover layer is bonded onto the substrate.

DETAILED DESCRIPTION OF THE INVENTION

Hereinafter, embodiments of the optical information recording medium of the present invention will be described.

The optical information recording medium of the first aspect of the invention has a substrate, an optional reflective layer, a recording layer, a barrier layer, a tackifier or adhesive layer, and a cover layer in this order. Each layer has a central hole. Information is recorded on the medium and reproduced from the medium by irradiating laser beams on the medium from the cover layer side. The barrier layer covers the surface of the recording layer and the outer peripheral end edge surface and/or the inner peripheral end edge surface of the recording layer. Further, the inner peripheral portions and/or the outer peripheral portions of the substrate and the cover layer adhere to each other in at least partial region thereof via the tackifier or the adhesive layer, and the maximum length of the partial region in the radial direction is 0.4 mm or more.

Figure 1:
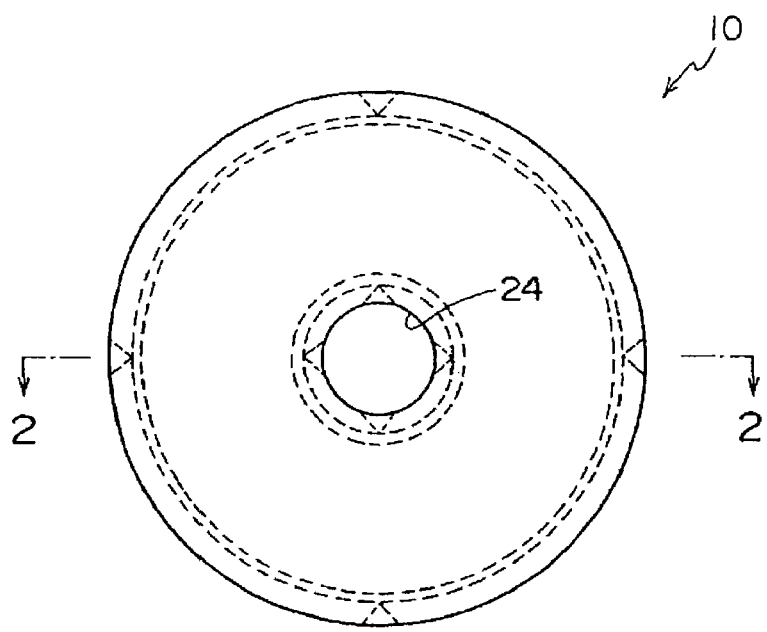
FIG. 1 is a plan view showing the optical information recording medium of the first aspect of the present invention.
Figure 2:
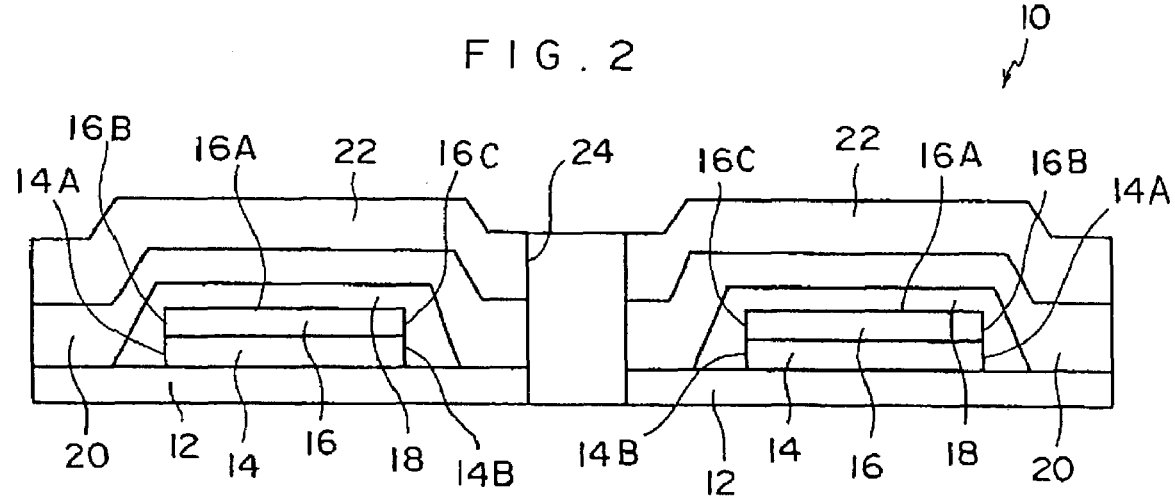
FIG. 2 is a sectional view along the line 2—2 in FIG. 1.

FIGS. 1 and 2 are a plan view and a sectional view showing one example of the optical information recording medium of the first aspect of the invention. As shown in FIG. 2, the optical information recording medium 10 has a substrate 12, a reflective layer 14, a recording layer 16, a barrier layer 18, an adhesive layer 20 and a cover layer 22 in this order and has a central hole 24 in the center. Of two circles shown by dotted lines in the vicinity of the outer peripheral edge in FIG. 1, the outer circle indicates the outer peripheral edge of the barrier layer 18, and the inner circle indicates the outer peripheral edges of the reflective layer 14 and the recording layer 16. Of two circles shown by dotted lines in the vicinity of the inner peripheral edge, the outer circle indicates the inner peripheral edges of the reflective layer 14 and the recording layer 16, and the inner circle indicates the inner peripheral edge of the barrier layer 18. That is, as shown in FIG. 2, the inner peripheral edges of the reflective layer 14 and the recording layer 16 are at the same position, and the outer peripheral edges thereof are also at the same position, and the barrier layer 18 covers the recording layer surface 16A and the outer peripheral end edge surfaces 14A and 16B of the reflective layer 14 and the recording layer 16 and the inner peripheral end edge surfaces 14B and 16C of the reflective layer 14 and the recording layer 16. Accordingly, the recording layer 16 is not exposed to the outside and is protected with the barrier layer 18 and thus has excellent storage aptitude.

In the optical information recording medium 10, the substrate 12 and the cover layer 22 adhere to each other via the adhesive layer 20 in eight regions (hereinafter referred to as "adhesion regions") indicated by fan-shaped dotted lines in FIG. 1. Among the eight regions, four regions are provided in the outer peripheral portion and four regions are provided in the inner peripheral portion. The maximum length, in the radial direction, of each of the eight adhesion regions disposed in the vicinity of the inner or outer peripheral edges (that is, the length between the apex of the adhesion region and the inner or outer peripheral edge of the optical information recording medium 10 in the radial direction) is 0.5 mm. With the presence of these adhesion regions, the reflective layer 14, the recording layer 16 and the barrier layer 18 adhere strongly to the substrate 12. Accordingly, the respective layers in the optical information recording medium 10 can be prevented from peeling. The outer peripheral portion refers to portions of the substrate 12 and the cover layer 22 which portions are outside of the outer peripheral edge of the barrier layer 18, and the inner peripheral portion refers to portions of the substrate 12 and the cover layer 22 which portions are inside of the inner peripheral edge of the barrier layer 18.

Figure 3:
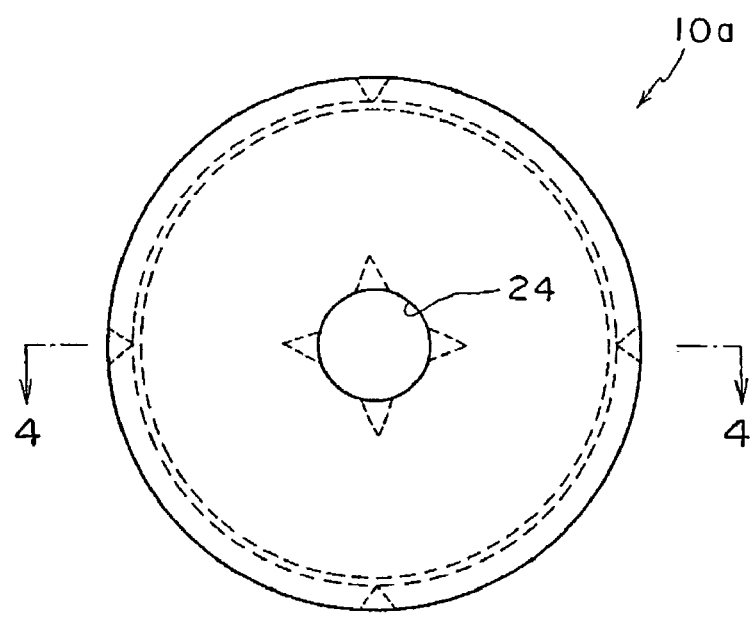
FIG. 3 is a plan view showing another example of the optical information recording medium of the first aspect of the invention.
Figure 4:
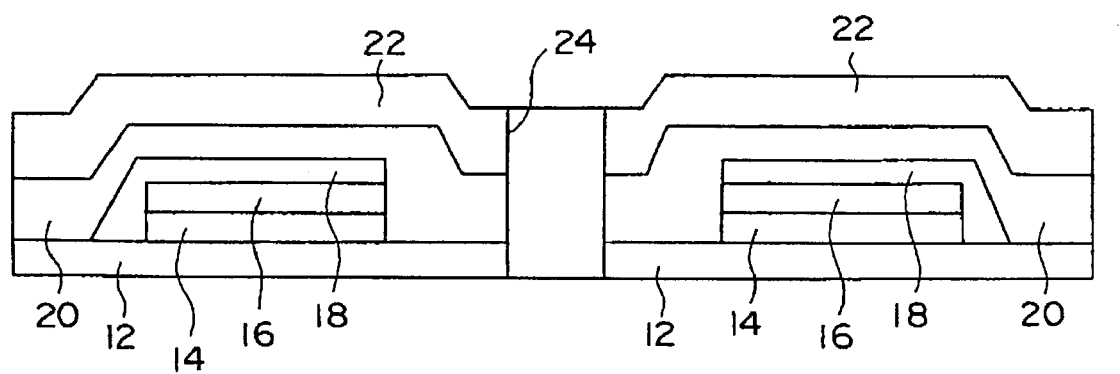
FIG. 4 is a sectional view along the line 4—4 in FIG. 3.
Figure 5:
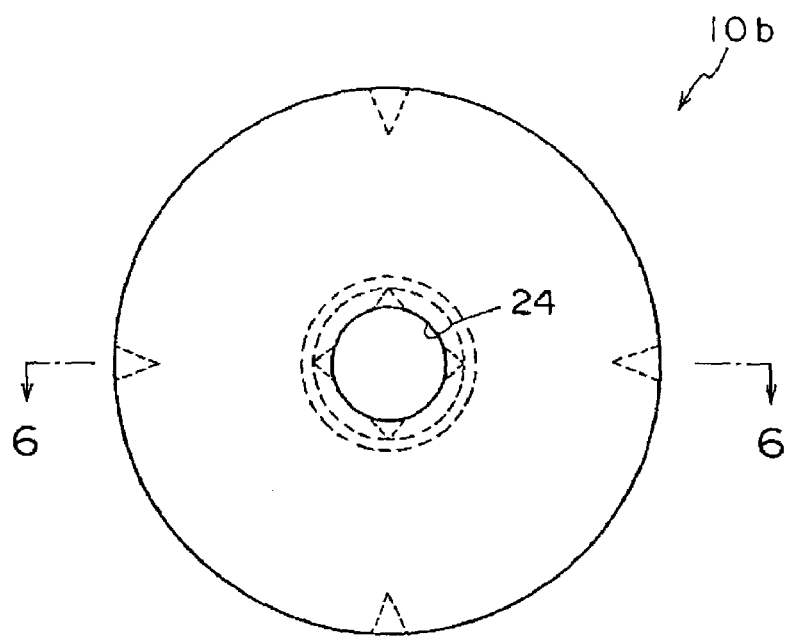
FIG. 5 is a plan view showing still another example of the optical information recording medium of the first aspect of the invention.
Figure 6:
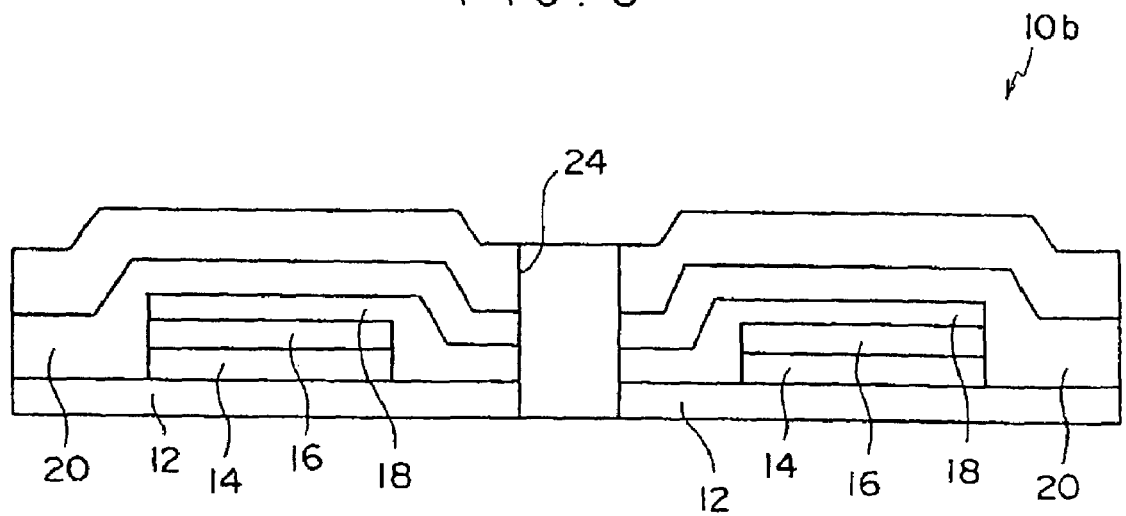
FIG. 6 is a sectional view along the line 6—6 in FIG. 5.

Now, two another examples of the optical information recording medium of the first aspect of the invention are shown (FIGS. 3 to 6). In FIGS. 3 to 6, the same elements as those in the optical information recording medium 10 shown in FIGS. 1 and 2 are given the same numerals. The optical information recording medium 10a in FIGS. 3 and 4 is different from the medium in FIGS. 1 and 2 in that the barrier layer 18 does not cover the inner peripheral end edge surfaces of the reflective layer 14 and the recording layer 16, and the optical information recording medium 10b in FIGS. 5 and 6 is different from the medium in FIGS. 1 and 2 in that the barrier layer 18 does not cover the outer peripheral end edge surfaces of the reflective layer 14 and the recording layer 16. These examples have excellent storage aptitude because the barrier layer 18 covers the surface and the outer or inner peripheral end edge surface of the recording layer 16, but the medium shown in FIGS. 1 and 2 in which the barrier layer 18 covers both the inner and outer peripheral end edge surfaces of the recording layer 16.

As described above, the barrier layer covers the surface of the recording layer and the end edge surfaces of the reflective layer and the recording layer, and thus the outer peripheral diameter and/or the inner peripheral diameter of the barrier layer are different from the corresponding diameter or diameters of the reflective layer and the recording layer, and the difference between the outer peripheral diameter of the barrier layer and the outer peripheral diameters of the reflective layer and the recording layer is preferably 0.1 to 2 mm, and more preferably 0.2 to 1 mm. The difference between the inner peripheral diameter of the barrier layer and the inner peripheral diameters of the reflective layer and the recording layer is preferably 0.1 to 5 mm, and more preferably 0.2 to 2 mm.

The optical information recording medium of the second aspect of the invention has a substrate, a reflective layer, a recording layer, a barrier layer, a tackifier or adhesive layer and a cover layer in this order. Each layer has a central hole. Information is recorded on the medium and reproduced from the medium by irradiating laser beams on the medium from the cover layer side. This reflective layer is larger than the recording layer so that an outer peripheral edge portion and/or an inner peripheral edge portion of the reflective layer extend past an outer peripheral edge portion and/or an inner peripheral edge portion of the recording layer, and the barrier layer adheres to the reflective layer's extended peripheral edge region. When the barrier layer adheres to either the outer or inner peripheral edge portion of the reflective layer, the edge of the reflective layer which edge is opposite to the edge portion of the reflective layer adhering to the barrier layer, and the corresponding edge of the recording layer are at the same position. Further, at least one of the inner and outer peripheral portions of the substrate and the cover layer adhere to each other in at least partial region thereof via the tackifier or adhesive layer, and the maximum length of the region in the radial direction is 0.4 mm or more.

Figure 7:
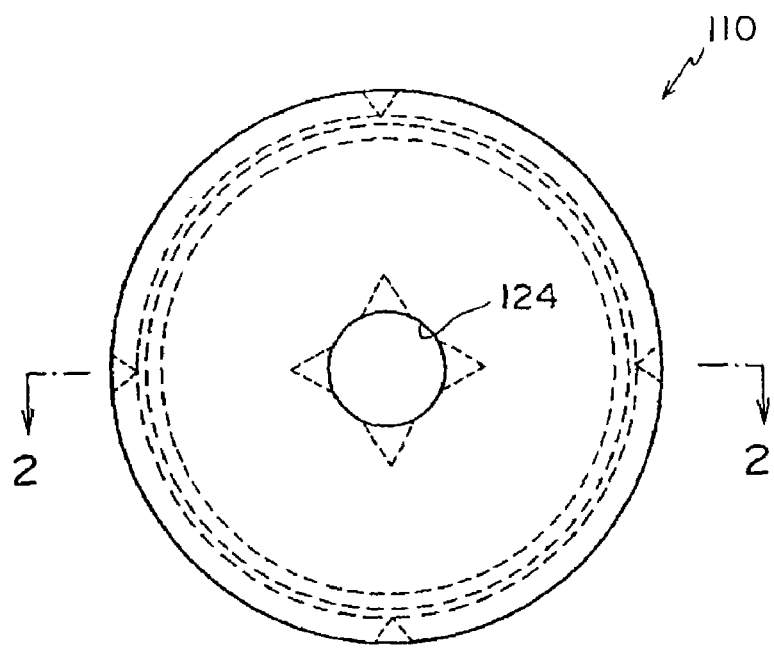
FIG. 7 is a plan view showing the optical information recording medium of the second aspect of the invention.
Figure 8:
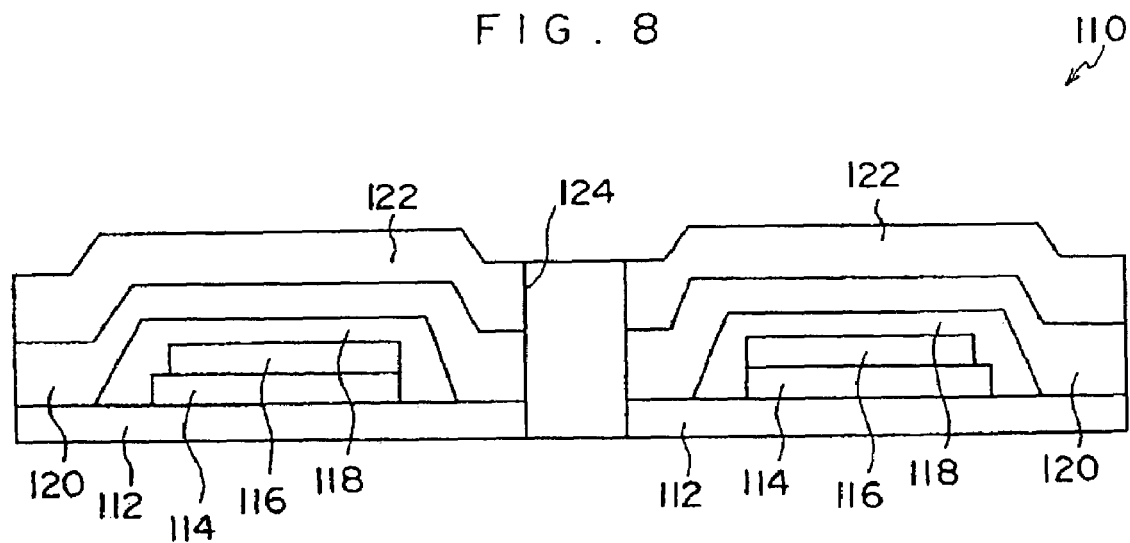
FIG. 8 is a sectional view along the line 2—2 in FIG. 7.

FIGS. 7 and 8 are a plan view and a sectional view showing one example of the optical information recording medium of the second aspect of the invention. As shown in FIG. 8, the optical information recording medium 110 has a substrate 112, a reflective layer 114, a recording layer 116, a barrier layer 118, an adhesive layer 120 and a cover layer 122 in this order, and has a central hole 124 in the center. Of three circles shown by dotted lines in the vicinity of the outer peripheral edge in FIG. 7, the outermost circle shows the outer peripheral edge of the barrier layer 118, the middle circle shows the outer peripheral edge of the reflective layer 114, and the inner circle shows the outer peripheral edge of the recording layer 116. That is, the barrier layer 118, as shown in FIG. 8, adheres to the outer peripheral edge portion of the reflective layer surface, and covers both the surface of the recording layer 116 and both peripheral end edge surfaces of the reflective layer 114 and recording layer 116. Due to this configuration, the outer peripheral edge portion of the reflective layer 114 is positioned further outside than the outer peripheral edge portion of the recording layer 116, and the inner peripheral edge portions of both the reflective layer 114 and the recording layer 116 are at the same position, with the neither portion extending further than the other. Thus, the substrate 112 does not come in contact with the recording layer 116. The substrate 112 and the recording layer 116 are generally comprised of an organic material (which will be described later in more detail), and impurities contained in the organic substrate 112 are shielded by the metallic reflective layer 114 and the inorganic barrier layer 118. Accordingly, the impurities do not adversely affect the recording layer 116, and thus, the recording layer 116 possesses excellent storage aptitude.

In the optical information recording medium 110, the substrate 112 and the cover layer 122 adhere to each other via the adhesive layer 120 in eight regions (hereinafter referred to as "adhesion regions") indicated by fan-shaped dotted lines in FIG. 7. Among the eight regions, four regions are provided in the outer peripheral portion and four regions are provided in the inner peripheral portion. The maximum length, in the radial direction, of each of the eight adhesion regions disposed in the vicinity of the inner or outer peripheral edge is 0.5 mm. By the presence of these adhesion regions, the reflective layer 114, the recording layer 116 and the barrier layer 118 adhere strongly onto the substrate 112. Accordingly, the respective layers in the optical information recording medium 110 can be prevented from peeling. The outer peripheral portion refers to portions of the substrate 112 and the cover layer 122 which portions are outside of the outer peripheral edge of the barrier layer 118, and the inner peripheral portion refers to portions of the substrate 112 and the cover layer 122 which portions are inside of the inner peripheral edge of the barrier layer 118.

Figure 9:
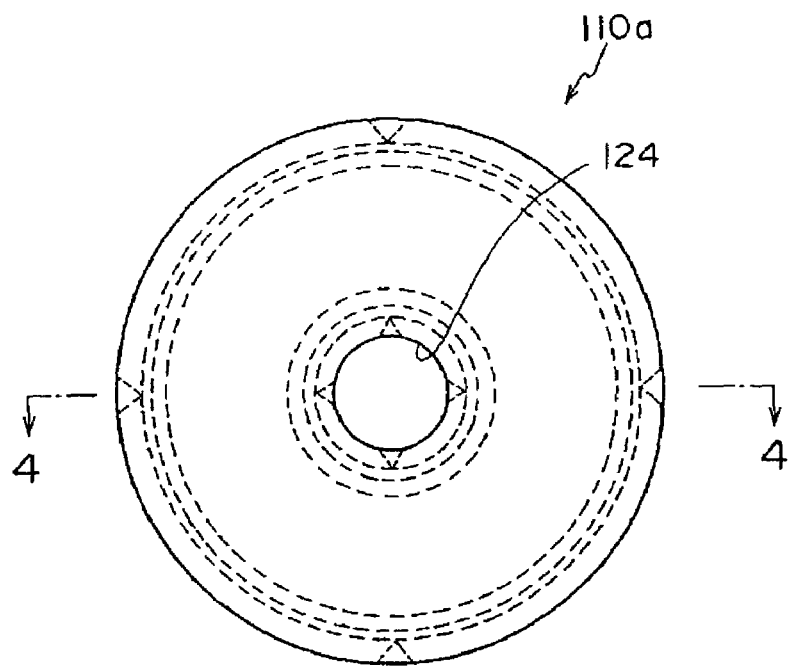
FIG. 9 is a plan view showing another example of the optical information recording medium in the second aspect of the invention.
Figure 10:
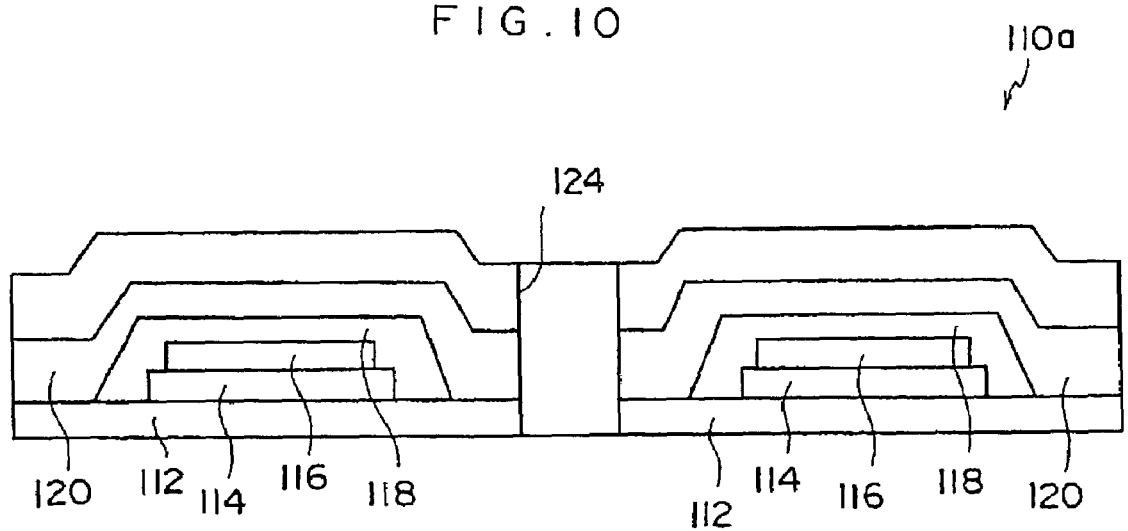
FIG. 10 is a sectional view along the line 4—4 in FIG. 9.

Now, two another examples of the optical information recording medium of the second aspect of the invention are shown (FIGS. 9 and 10). In FIGS. 9 and 10, the same elements as those in the optical information recording medium 110 shown in FIGS. 7 and 8 are given the same numericals. The optical information recording medium 110a in FIGS. 9 and 10 is different from the medium in FIGS. 7 and 8 in that the barrier layer 118 also adheres to the inner peripheral edge portion of the reflective layer surface. This example is superior in the storage aptitude of the recording layer 116 to the optical information recording medium in FIGS. 7 and 8 because the barrier layer 118 adheres to the outer and inner peripheral edge portions of the reflective layer surface.

As described above, the barrier layer adheres to the outer peripheral edge portion and/or the inner peripheral edge portion of the reflective layer surface, and thus the outer peripheral diameter and/or the inner peripheral diameter of the reflective layer are different from the corresponding diameter or diameters of the recording layer, respectively and the difference between the outer peripheral diameter of the reflective layer and the outer peripheral diameter of the recording layer is preferably 0.1 to 2 mm, and more preferably 0.2 to 1 mm. The difference between the inner peripheral diameter of the reflective layer and the inner peripheral diameter of the recording layer is preferably 0.1 to 5 mm, and more preferably 0.2 to 2 mm.

The outer peripheral diameter and/or inner peripheral diameter of the barrier layer are different from the corresponding diameter or diameters of the reflective layer, respectively and the difference between the outer peripheral diameter of the barrier layer and the outer peripheral diameter of the reflective layer is preferably 0.1 to 2 mm, and more preferably 0.2 to 1 mm. The difference between the inner peripheral diameter of the barrier layer and the inner peripheral diameter of the reflective layer is preferably 0.1 to 5 mm, and more preferably 0.2 to 2 mm.

In FIGS. 1 to 10, each of the outer and inner peripheral portions has the four adhesion regions but the invention is not limited to this configuration. It is preferable that a large number (a plurality) of adhesion regions may be provided, or that entire surfaces of the outer and inner peripheral portions be the adhesion regions. The shape of the adhesion region is not limited to the fan shape and may be polygonal, circular, semicircular, or oval.

In the first and second aspects of the invention, the maximum length of the adhesion region in the radial direction is 0.4 mm or more, and when the maximum length is less than 0.4 mm, the adhesion strength may be insufficient and the layers may peel. The maximum length in the outer peripheral portion is more preferably 0.6 mm or more, and still more preferably 0.7 mm or more. The upper limit of the maximum length in the outer peripheral portion is 2 mm.

The maximum length, in the radial direction, of the adhesion region in the inner peripheral portion is more preferably 2.5 mm or more, still more preferably 3 mm or more, and further more preferably 4 mm or more. The upper limit of the maximum length in the inner peripheral portion is 15 mm.

The optical information recording medium in the first and second aspects is preferably a heat mode recordable optical information recording medium.

The optical information recording medium in the third aspect of the invention has a substrate, an optional reflective layer, a recording layer, an optional barrier layer and a cover layer in this order, and information is recorded on the medium and reproduced from the medium by irradiating laser beams on the medium from the cover layer side. The central line average roughness (Ra) of the cover layer surface abutting the recording layer surface is 0.1 µm or more, and at least a portion of each of the inner and outer peripheral edge portions of the cover layer is bonded onto the substrate. In the invention, the phrase "the inner and outer peripheral edge portions of the cover layer are bonded to the substrate" usually means that the cover layer is bonded via an adhesive or a tackifier onto the substrate. However, when the reflective layer greater than the recording region is provided on the substrate, the cover layer may be bonded to the substrate via the reflective layer.

Now, the cover layer which is characteristic of the optical information recording medium in the third aspect of the invention will be described.

The cover layer has the same disk shape as that of the substrate described later, and is bonded to an adhesion region (described later) of a disk-shaped laminate including at least the substrate and the recording layer.

In the third aspect of the invention, the central line average roughness (Ra) of the cover layer surface abutting the recording layer surface should be 0.1 µm or more.

In the optical information recording medium of the third aspect of the invention, the inner and outer peripheral edge portions of the cover layer is bonded onto the substrate while the cover layer surface having surface roughness of the predetermined range abuts the recording layer surface. In the region having the recording layer, convex portions of the cover layer having the above surface roughness are brought into contact with the recording layer, and the cover layer and the substrate are bonded to each other in the region other than the recording region by bonding the inner and outer peripheral edge portions of the cover layer onto the substrate.

The cover layer surface abutting the recording layer surface has predetermined roughness, and the cover layer is bonded onto the substrate in the inner and outer peripheral edge portions thereof, whereby a predetermined, non-adhering gap due to the surface roughness can be formed between the recording layer and the cover layer. This gap can prevent the deflection or warpage of the cover layer due to the adhesion of the recording layer to the cover layer. Such a cover layer enables the optical information recording medium of the invention to have excellent recording characteristics.

As described above, the cover layer in the third aspect of the invention is characterized in that the central line average roughness (Ra) of the cover layer surface abutting the recording layer surface is 0.1 µm or more. When this surface roughness is too high, adverse effects such as scattering of incident light due to unevenness on the surface occur, and thus the central line average roughness (Ra) is preferably 500 µm or less. That is, the central line average roughness (Ra) of the cover layer surface abutting the recording layer surface is preferably in the range of 0.1 to 500 µm, more preferably 1 to 300 µm, and still more preferably 5 to 100 µm.

The central line average roughness (Ra) is the arithmetic average of absolute values of deviations between a central line of a measurement length L removed from a roughness curve in the direction of the central line and the roughness curve.

When the surface roughness is less than 0.1 µm, the adhesion of the cover layer to the recording layer is strong, so that it is hard to form a predetermined non-adhering gap in some cases.

The inner and outer peripheral edge portions of the cover layer are bonded onto the substrate. The phrase "inner and outer peripheral edge portions" refers to areas serving as the adhesion regions of the cover layer, and these regions of the disk-shaped cover layer do not abut the recording layer (recording region) and-includes the inner and outer peripheral edges.

A conventionally known methods can be used as a method of bonding the adhesion region, and specific examples thereof include a fusion method and a method using a tackifier or an adhesive. In terms of avoiding adversely affecting the dye in the recording layer, the adhering regions are preferable placed apart from a region of capable of abutting the recording layer by 0.1 mm or more, more preferably by 0.5 mm or more, and still more preferably by 1 mm or more. This is due to the fact that the heating means used in the fusion method or the adhesive may negatively affect the dye in the recording layer. Further, it is preferable to bond a region other than a clump area (usually in the radius range of 11 to 16.5 mm from the center of the disk-shaped cover layer) which is a region used in fixing or adsorption at the time of production of the optical information recording medium.

From this viewpoint, the adhesion region is provided in regions in the radius range of 17 to 22 mm and in the radius range of 56 to 60 mm from the center of the disk-shaped cover layer, and the width of the adhesion region is preferably 0.2 to 2 mm. Further, the adhesion region may be provided in the entire region of the above-described range, or in the partial regions of the range at equal intervals.

Now, the adhesion method used in the third aspect of the invention is described.

The fusion method is a method used in bonding relatively soft plastics having a low melting point. Examples thereof include heat fusion, electromagnetic wave fusion, ultrasonic fusion and frictional fusion, and ultrasonic fusion is preferable.

When the cover layer is bonded by ultrasonic fusion, the cover layer itself may be fused or an adhesive between the cover layer and the substrate may be fused depending on the material of the cover layer.

In the third aspect of the invention, the method of fusing the cover layer itself is generally used, and specifically, the inner and outer peripheral edge portions of the cover layer which serve as regions to be fused by ultrasonic fusion, are positioned on the substrate, an ultrasonic horn is placed on the cover layer, ultrasonic vibration is applied thereto by the ultrasonic horn while the inner and outer peripheral edge portions are pressurized by the ultrasonic horn, the cover layer itself is fused and cured by using the mechanical friction and viscoelastic behavior of the bonding region, and thus bonding is terminated.

When an adhesive is provided between the cover layer and the substrate, a liquid adhesive may be applied to the cover layer and/or the substrate and dried prior to ultrasonic fusion, or the adhesive in the form of film, pellets, string, B-stage or the like may be provided between the cover layer and the substrate, and then heated by ultrasonic wave while pressurized. A double-sided adhesive tape is advantageous in that the process can be simplified and that the tape is safe and does not need specific facilities which are required when a solvent is used.

Further, when the cover layer is bonded by an adhesive or tackifier, the adhesive or tackifier is disposed between the substrate and the inner and outer peripheral edge portions of the cover layer serving as regions to be adhered and cured and thus bonding is terminated. In this case, the adhesive or tackifier is preferably applied to the adhesion region by screen printing or with a dispenser.

Examples of the adhesive used include UV curable resin, EB curable agent, and thermosetting resin, and the UV curable resin is preferable.

When the UV curable resin is used as the adhesive, the UV curable resin itself or a coating solution prepared by dissolving it in a suitable solvent such as methyl ethyl ketone or ethyl acetate may be supplied to the surface of the substrate or the cover layer. In ordr to prevent warpage of the optical information recording medium, the UV curable resin having low shrinkage percentage at the time of curing is preferably used. Examples of such a UV curable resin include SD-640 manufactured by Dainippon Ink and Chemicals, Inc.

Examples of the tackifier include acrylic, rubber and silicone tackifier, and the acrylic tackifier is preferable from the viewpoint of transparency and durability. The acrylic tackifier is preferably products obtained by copolymerizing a main monomer such as 2-ethylhexyl acrylate or n-butyl acrylate, a short-chain alkyl acrylate and/or methacrylate which is used to improve cohesive powder, such as methyl acrylate, ethyl acrylate or methyl methacrylate, and acrylic acid, methacrylic acid, an acrylamide derivative, maleic acid, hydroxyethyl acrylate and/or glycidyl acrylate as a component which can be a crosslinking point with a crosslinking agent. The glass transition temperature (Tg) and crosslinking density of the tackifier can vary according to the proportion and type of the main monomer, the short-chain component and the component for adding a crosslinking point.

The crosslinking agent used in combination with the tackifier include isocyanate crosslinking agents. Examples of the isocyanate crosslinking agent include isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate, and triphenylmethane triisocyanate, and products of any of these isocyanates with a polyalcohol, and polyisocyanates formed by condensation of the isocyanates. Commercial products of these isocyanates include Coronate L, Clonate HL, Coronate 2030, Coronate 2031, Millionate MR and Millionate HTL manufactured by Nippon Polyurethane Industry Co., Ltd.; Takenate D-102, Takenate D-110N, Takenate D-200 and Takenate D-202 manufactured by Takeda Chemical Industries, Ltd.; and Desmodule L, Desmodule IL., Desmodule N and Desmodule HL manufactured by Sumitomo Bayer Urethane Co., Ltd.

The amount of the tackifier or adhesive applied is regulated such that the thickness of the finally formed adhesive or tackifier layer is in the range of 0.1 to 100 µm, preferably 0.5 to 50 µm, and more preferably 10 to 30 µm.

Hereinafter, the substrate and each layer used in the optical information recording mediums used in the first to third aspects of the invention except the adhesive, the tackifier and the adhesion method used in the third aspect are described in more detail.

<Substrate>

Various materials used as substrate materials in conventional optical information recording mediums can be used in the invention.

Specific examples thereof include glass; polycarbonate; acrylic resin such as polymethyl methacrylate; vinyl chloride resin such as polyvinyl chloride and vinyl chloride copolymers; epoxy resin; amorphous polyolefin; polyester; and metal such as aluminum. These materials may be used alone or in combination.

Among the materials described above, polycarbonate and amorphous polyolefin are preferable from the viewpoint of moisture resistance, dimensional stability and low prices, and polycarbonate is particularly preferable. The thickness of the substrate is preferably 0.5 to 1.4 mm in the first and second aspects, and preferably 1.1±0.3 mm in the third aspect.

The substrate has a guide groove for tracking or unevenness (pre-groove) expressing information such as address signal. Preferably, the pre-groove is formed directly on the substrate at the time of injection molding or extrusion molding of a resin material such as polycarbonate.

The pre-groove may be formed by providing a pre-groove layer. As the material of the pre-groove layer, a mixture of at least one monomer (or oligomer) of acrylic acid monoester, diester, triester and tetraester and a photopolymerization initiator can be used. For formation of the pre-groove layer, for example, the mixture of an acrylic acid ester and a polymerization initiator is applied onto an accurately produced mold (stumper), and a substrate is placed on the applied solution layer, and the applied layer is cured by irradiating with UV rays via the substrate or mold to fix the applied layer to the substrate, and then the substrate is removed from the mold. The thickness of the pre-groove layer is generally in the range of 0.01 to 100 μm, and preferably 0.05 to 50 μm.

To achieve higher recording density, a substrate having a pre-groove which has a track pitch narrower than that of CD-R and DVD-R is preferably used. In the first and second aspects, the track pitch of the pre-groove is 250 to 400 nm. In the first and second aspects, the depth of the pre-groove (groove depth) is in the range of 10 to 150 nm, preferably 15 to 100 nm, more preferably 20 to 80 nm, and most preferably 20 to 60 nm.

In the third aspect of the invention, the track pitch of the pre-groove on the substrate is preferably in the range of 200 to 400 nm, and more preferably 250 to 350 nm.

The depth of the pre-groove in the third aspect is preferably in the range of 10 to 150 nm, more preferably 20 to 100 nm, and still more preferably 30 to 80 nm. The half width of the pre-groove in the third aspect is preferably in the range of 50 to 250 nm, and more preferably 100 to 200 nm.

When the reflective layer described later is provided, an undercoat layer is preferably formed on the substrate surface on which the reflective layer is to be provided, for the purpose of improving flatness and adhesive strength.

Examples of the material of the undercoat layer include polymers such as polymethyl methacrylate, acrylic acid-methacrylic acid copolymers, styrene-maleic anhydride copolymers, polyvinyl alcohol, N-methylol acrylamide, styrene-vinyltoluene copolymers, chlorosulfonated polyethylene, nitrocellulose, polyvinyl chloride, chlorinated polyolefin, polyester, polyimide, vinyl acetate-vinyl chloride copolymers, ethylene-vinyl acetate copolymers, polyethylene, polypropylene and polycarbonate; and surface property improving agent such as a silane coupling agent.

The undercoat layer can be formed by dissolving or dispersing the above-described material in a suitable solvent and then applying the resulting coating solution onto the surface of the substrate by a coating method such as spin coating, dip coating or extrusion coating. The thickness of the undercoat layer is generally in the range of 0.005 to 20 μm, and preferably 0.01 to 10 μm.

<Reflective Layer>

The reflective layer may be provided between the substrate and the recording layer, for the purpose of improving reflectance at the time of reproduction of information. In the reflective layer, a light reflective material having high reflectance for laser beams is used. The reflectance is preferably 70% or more.

Examples of the light reflective material having high reflectance include metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, semi-metals and stainless steel. These light reflective materials can be used alone or in combination thereof or as an alloy. Cr, Ni, Pt, Cu, Ag, Au, Al and stainless steel are preferably used among them. The light reflective material is particularly preferably Au, Ag, Al or an alloy thereof, and most preferably Au, Ag or an alloy thereof.

The reflective layer can be formed on the substrate by vapor-depositing, sputtering or ion-plating the light reflective material described above. The thickness of the reflective layer is generally in the range of 10 to 300 nm, and preferably 50 to 200 nm.

When the reflectance of the recording layer described below is sufficiently high, the reflective layer is not always necessary in the first and third aspects, and in this case, the recording layer acts as a reflective layer.

<Recording Layer>

The recording layer preferably contains a dye having the absorption maximum in the wavelength range of laser beams and particularly preferably contains a dye having the absorption maximum in the wavelength range of 500 nm or less so as to enable recording and reproduction by laser beams in this wavelength range. The coloring compound is preferably at least one selected from a triazole compound, a phthalocyanine compound, a porphyrin compound, an aminobutadiene compound, a cyanine compound, an oxonol dye, a metal complex dye, and an azo dye, and the phthalocyanine compound is preferably substituted with alkoxy, sulfonamide, sulfamoyl or sulfonate.

Specifically, dyes described in JP-A Nos. 4-74690, 8-127174, 11-53758, 11-334204, 11-334205, 11-334206, 11-334207, 2000-43423, 2000-108513 and 2000-158818 can be used.

Further, organic compounds such as a triazole compound, a triazine compound, a cyanine compound, a merocyanine compound, an aminobutadiene compound, a phthalocyanine compound, a cinnamic acid compound, a viologen compound, an azo compound, an oxonol benzoxazole compound and a benzotriazole derivative can also be preferably used. Among these compounds, cyanine, aminobutadiene, benzotriazole and phthalocyanine are preferable.

The recording layer is formed by dissolving a recording material such as the dye (organic material and the like) and an optional binder in a suitable solvent to prepare a recording layer coating solution, then applying the recording layer coating solution onto the pre-groove surface of the substrate or onto the surface of the reflective layer, and drying the resultant coating layer.

The method of dissolving the dye and the binder can be ultrasonic treatment, homogenizer treatment, disperser treatment, sand mill treatment, stirring treatment, or heating.

Examples of the solvent used in the recording layer coating solution include esters such as butyl acetate, methyl lactate, ethyl lactate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol, n-butanol and diacetone alcohol; fluorinated solvents such as 2,2,3,3-tetrafluoropropanol; and glycol ethers such as ethylene glycol monomethyl ether, ethylene glycol monoethyl ether and propylene glycol monomethyl ether.

In consideration of the solubility of the recording material and binder used, the above-described solvents can be used alone or in combination thereof. Depending on the object, the coating solution may contain any additive such as an antioxidant, an UV absorbent, a plasticizer and a lubricant and the like.

Examples of the binder include naturally occurring organic polymers such as gelatin, cellulose derivatives, dextran, rosin and rubber; and synthetic organic polymers such as hydrocarbon resins (e.g. polyurethane, polyethylene, polypropylene, polystyrene and polyisobutylene), vinyl resins (e.g. polyvinyl chloride, polyvinylidene chloride, and polyvinyl chloride-polyvinyl acetate copolymers), acrylic resins (e.g. polymethyl acrylate and polymethyl methacrylate), polyvinyl alcohol, chlorinated polyethylene, epoxy resin, butyral resin, rubber derivatives, and initial condensates of thermosetting resins (e.g. phenol-formaldehyde resin). When the binder is used in the recording layer, the amount (mass) of the binder is generally 0.01 to 50 times, and preferably 0.1 to 5 times as much as that of the recording material. The self stability of the recording layer can also be improved by incorporating the binder into the recording layer.

The concentration of the recording material in the recording layer coating solution is generally in the range of 0.01 to 15% by mass, preferably 0.01 to 10% by mass, more preferably 0.1 to 10% by mass, still more preferably 0.1 to 5% by mass, further more preferably 0.5 to 5% by mass, and most preferably 0.5 to 3% by mass.

Examples of the method of applying the recording layer coating solution include a spraying method, a spin coating method, a dipping method, a roll coating method, a blade coating method, a doctor rolling method and a screen printing method. The recording layer may be a single layer or a plurality of layers. The thickness of the recording layer in the first and second aspects is generally in the range of 20 to 500 nm, preferably 30 to 300 nm, and more preferably 50 to 100 nm. The thickness of the recording layer in the third aspect is generally in the range of 20 to 500 nm, and preferably 50 to 300 nm.

The coating temperature is generally 23 to 50° C., preferably 24 to 40° C., and more preferably 25 to 37° C.

To improve the light resistance of the recording layer, the recording layer can contain any color fading inhibitor.

A singlet oxygen quencher is generally used as the color fading inhibitor. As the singlet oxygen quencher, those described in prior art patent specifications can be used.

Examples of such color facing inhibitors are described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, 4-25492, Japanese Patent Application Publication (JP-B) Nos. 1-38680, 6-26028, German Patent No. 350,399, and Journal of the Chemical Society of Japan, October Issue, page 1141.

The amount of the fading color inhibitor such as the singlet oxygen quencher is usually in the range of 0.1 to 50% by mass, preferably 0.5 to 45% by mass, more preferably 3 to 40% by mass, and still more preferably 5 to 25% by mass, based on the amount of the recording compound.

In the optical information recording medium of the second aspect of the invention, the recording layer coating solution is applied to the reflective layer and then the outer peripheral edge portion and/or the inner peripheral edge portion of the recording layer are removed by washing in order to secure a region for allowing the barrier layer to adhere to the outer peripheral edge portion and/or the inner peripheral edge portion of the reflective layer.

<Barrier Layer>

A barrier layer may be provided on the surface of the recording layer in order to improve the adhesion of the recording layer to the cover layer and the preservability of the dye, and in the first and second aspects, the barrier layer is formed between the recording layer and the tackifier or adhesive layer described later. The material of the barrier layer is not particularly limited, insofar as it can transmit laser beams, but it is preferably a dielectric. Specifically, an inorganic oxide, nitride, sulfide or carbide is used, and examples thereof include an oxide, nitride, carbide and sulfide containing at least one atom selected from Zn, Si, Ti, Te, Sm, Mo and Ge. Specifically, ZnS, $TiO_2$, $SiO_2$, $GeO_2$, $Si_3N_4$, $Ge_3N_4$, and $MgF_2$ can be used, and a hybrid such as ZnS—$SiO_2$ may also be used. Among these, ZnS—$SiO_2$ or $SiO_2$ is preferable. The barrier layer can be formed by sputtering, or ion plating, and the thickness thereof is preferably 1 to 100 nm.

In the first and second aspects of the invention, a barrier layer-free region is provided with a mask in order to secure the region allowing the cover layer to adhere to the substrate.

In the optical information recording medium of the first and second aspects of the invention, the cover layer described later is stuck via the following tackifier or adhesive layer onto the barrier layer.

<Tackifier Layer>

The tackifier layer is provided in order to bond the cover layer to the substrate, and a wide variety of known tackifiers can be used. Acrylic tackifiers and rubber type tackifiers such as natural rubber, styrene-isoprene-styrene copolymers (SIS) and styrene-butadiene-styrene copolymers (SBS) can be used as such in the first and second aspects. Preferably, the tackifier is previously applied onto the cover layer surface onto which the barrier layer is to be stuck. In the first and second aspects, the thickness of the tackifier layer is preferably in the range of 1 to 10 μm. and more preferably 2 to 5 μm.

<Adhesive Layer>

Similar to the tackifier layer, the adhesive layer is provided in order to bond the cover layer to the substrate. Examples of the material of the adhesive layer in the first and second aspects include a photo-curable resin, and a two-component adhesive, and the photo-curable resin is preferable among them, and the resin having low shrinkage percentage at the time of curing is preferable as such in order to prevent warpage of the disk. Examples of such a photo-curable resin include UV curable resins (UV curable adhesives) such as SD-640, SD-661 and SD-347 manufactured by Dainippon Ink and Chemicals, Inc. In the first and second aspects, the thickness of the adhesive layer is preferably in the range of 1 to 1000 µm, more preferably 5 to 500 µm, and still more preferably 10 to 100 µm, in order to attain elasticity.

The material of the adhesive layer in the first and second aspects may also be a radiation-curable resin having in the molecule two or more double bonds sensitive to radiation, and examples thereof include acrylates, acrylamide, methacrylates, methacrylic acid amides, allyl compounds, vinyl ethers and vinyl esters. The material is preferably a polyfunctional acrylate compound and methacrylate compound.

Examples of bifunctional compound include those in which acrylic acid or methacrylic acid is added to an aliphatic diol, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate or tripropylene glycol dimethacrylate.

In the first and second aspects, polyether acrylates or polyether methacrylates in which acrylic acid or methacrylic acid is added to a polyether polyol such as polyethylene glycol, polypropylene glycol or polytetramethylene glycol, or polyester acrylates or polyester methacrylates in which acrylic acid or methacrylic acid is added to a polyester polyol obtained from known bibasic acids and glycol can also be used.

In the first and second aspects, polyurethane acrylate or polyurethane methacrylate in which acrylic acid or methacrylic acid is added to a polyurethane obtained by reacting known polyol or diol with polyisocyanate can also be used.

In the first and second aspects, compounds having a cyclic structure, for example bisphenol A, bisphenol F, hydrogenated bisphenol A and hydrogenated bisphenol F; products in which acrylic acid or methacrylic acid is added to an alkylene oxide adduct of the above-described bisphenol; diacrylate modified with isocyanuric acid alkylene oxide and dimethacrylate modified with isocyanuric acid alkylene oxide; and tricyclodecane dimethanol diacrylate and tricyclodecane dimethanol dimethacrylate can also be used.

Electron ray and UV ray can be used as the radiation. When UV ray is used, a photopolymerization initiator should be added to the above-described compound. An aromatic ketone is used as the photopolymerization initiator. The aromatic ketone is not particularly limited, but is preferably one having a relatively high absorption coefficient at wavelengths of 254, 313, and 865 nm at which brightline spectra of a mercury lamp used ordinarily as a light source for irradiation with UV ray appear. Typical examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone and Michler's ketone, and various aromatic ketones can be used. Further, UV-curable adhesives containing a photopolymerization initiator are commercially available and may be used. A mercury lamp is used as the UV light source. A mercury lamp of 20 to 200 W/cm is used at a rate of 0.3 to 20 m/min. It is generally preferable that the distance between the substrate and the mercury lamp is 1 to 30 cm.

As an electron beam accelerator, the accelerator in a scanning system, in a double scanning system or in a curtain beam system can be used, and the accelerator in a curtain beam system is preferably used because it provides high output power relatively inexpensively. With respect to the electron ray characteristics, the accelerating voltage is 100 to 1000 kV, and preferably 150 to 300 kV, and the absorbed dose is 0.5 to 20 Mrad, and preferably 1 to 10 Mrad. If the accelerating voltage is 100 kV or less, the transmission amount of energy is insufficient. Moreover, the voltage of more than 1000 kV is not preferable from an economical viewpoint, because the efficiency of energy used in polymerization becomes low.

In order to prevent warpage of the disk, the irradiation of the coating layer with a UV ray is conducted preferably with a pulse-type irradiation device (preferably a UV irradiation device). The pulse interval is preferably msec or less, and more preferably 1 sec or less. The irradiation dose of one pulse is not particularly limited, but is preferably not greater than 3 kW/cm$^2$, and more preferably not greater than 2 kW/cm$^2$.

The irradiation frequency is not particularly limited, but is preferably 20 times or less, and more preferably 10 times or less.

<Cover Layer>

The material of the cover layer is not particularly limited, insofar as it is transparent, but it is preferable to use polycarbonate; acrylic resin such as polymethyl methacrylate; vinyl chloride resin such as polyvinyl chloride and a vinyl chloride copolymer; epoxy resin; amorphous polyolefin; polyester; and/or triacetate cellulose, and the polycarbonate or triacetate cellulose is preferably used among them. Further, a material having a moisture absorption coefficient of 5% or less at 23° C. under 50% RH is preferably used. With respect to the surface physical properties of the cover layer, the surface roughness of the light incidence surface (both two- and three-dimensional roughness parameters) is preferably 5 nm or less.

From the viewpoint of condensation degree of light used in recording and reproduction, the birefringence of the cover layer is preferably 10 nm or less.

The term "transparency" means that the transmittance of light used in recording and reproduction is 80% or more.

The cover layer may contain various additives in such a range that the effect of the invention is not deteriorated. The cover layer may contain, for example, a UV absorbent for cutting light having an wavelength of 400 nm or less and/or a dye for cutting light having an wavelength of 500 nm or more.

The thickness of the cover layer is determined suitably depending on the wavelength of laser beam for use in recording or reproduction or on NA, but in the first and second aspects, the thickness of the cover layer is preferably in the range of 0.01 to 0.2 mm, more preferably 0.03 to 0.1 mm, and still more preferably 0.05 to 0.095 mm. In the third aspect, the thickness of the cover layer is preferably in the range of 0.03 to 0.15 mm, and more preferably 0.05 to 0.12 mm. The cover layer can be easily handled in the step of bonding the cover layer and the coma aberration can be suppressed by regulating the thickness in this range.

The method of bonding the cover layer via the tackifier layer onto the barrier layer can be a method in which the tackifier is applied onto the cover layer, and dried, and the cover layer is put on the tackifier layer and pressed by a roller.

In the first and second aspects, the thickness of the tackifier layer is preferably in the range of 1 to 200 μm, more preferably 5 to 10 μm, and still more preferably 10 to 50 μm, in order to attain elasticity.

The temperature at the time of applying the tackifier is preferably in the range of 23 to 50° C., more preferably 24 to 40° C., and still more preferably 25 to 37° C., in order to regulate the viscosity. After the tackifier is applied, the coating layer is dried preferably at 50 to 300° C., more preferably 80 to 200° C., and still more preferably 100 to 150° C. The temperature at the time of bonding the cover layer is preferably in the range of 0 to 100° C., and more preferably 15 to 50° C.

Alternatively, the tackifier is applied onto a release film releasable from the tackifier, a solvent contained in the tackifier is evaporated, the cover layer is bonded onto the resultant coating layer, the release film is removed, the tackifier is transferred to the cover layer and the cover layer is bonded onto the barrier layer. This method is particularly preferable when the solvent contained in the tackifier dissolves the cover layer.

When a sheet having the release film and the tackifier layer is used, the release film used as the substrate is not particularly limited, insofar as it is insoluble in the solvent contained in the tackifier, and examples of the release film material include plastic films of polyethylene terephthalate, polypropylene, polyethylene or polyvinyl chloride, paper such as kraft paper, woodfree paper, crecoat paper and Japanese paper, nonwoven fabrics made of rayon or polyester, woven fabrics made of synthetic fibers such as polyester, nylon or acrylic resin, and metal foils of aluminum, copper or stainless steel, and the plastic films are preferable because the releasing agent can be applied thereto continuously, thinly and uniformly.

The releasing agent can be any of conventionally used releasing agents such as a silicone releasing agent, or a long-chain alkyl releasing agent.

An example of how information is recorded and reproduced in the optical information recording medium of the invention is as follows. First, a blue-violet recording light (e.g., wavelength of 405 nm) is irradiated onto the optical information recording medium from the cover layer side via an object lens while the medium is being rotated at a predetermined linear velocity (0.5 to 10 m/sec) or at a predetermined angular velocity. This light irradiation causes the temperature of the portion of the recording layer that absorbs the light to rise, leading to the recording of information by, for example, the formation of pits, where the optical characteristics of the recording layer has changed. This information can be reproduced by irradiating a blue-violet laser beam onto the optical information recording medium from the cover layer side while the optical recording medium is being rotated at a predetermined linear velocity and detecting the reflected light.

Examples of the laser beam sources having an oscillation wavelength of 500 nm or less include a blue-violet semiconductor laser having an oscillation wavelength in the range of 390 to 415 nm, and a blue-violet SHG laser having a central oscillation wavelength of 425 nm.

Further, the NA of the object lens used in pickup is preferably 0.7 or more, and more preferably. 0.85 or more, in order to increase recording density.

EXAMPLES

Hereinafter, the present invention will be described in further detail while referring the Examples, which are not intended to limit the invention.

Example 1

Injection-molded polycarbonate resin substrates having a thickness of 1.1 mm, an outer diameter of 120 mm and an inner diameter of 15 mm and having a spiral groove (track pitch: 340 nm, groove depth: 30 nm, groove width: 150 nm) were prepared, and a reflective layer made of silver having a thickness of 120 nm was formed on the groove surface in an argon atmosphere by DC sputtering with Cube manufactured by Unaxis.

Then, 2 g of dye A represented by the following structural formula was dissolved in 100 ml of 2,2,3,3-tetrafluoropropanol to prepare a dye coating solution. The dye coating solution was applied uniformly onto the reflective layer by spin coating to form a recording layer having a thickness of 100 nm in the groove and a thickness of 70 nm in the land region. Then, the coating layer was annealed in a clean oven at 40° C. for 1 hour. In this annealing, the substrates were supported by a vertical stack pole while spaced apart with a spacer.

Dye A

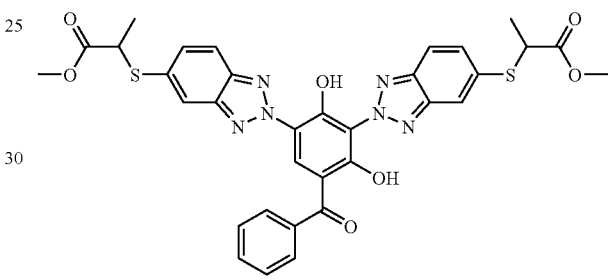

After annealing, a barrier layer was formed by RF sputtering ZnS—SiO$_2$ (8:2) at a sputter power of 4 kW at a pressure of $2\times10^{-2}$ hPa for 2 seconds such that the thickness thereof was 5 nm. At this time, the barrier layer was formed such that it covered the surface of the recording layer and the outer peripheral end edge surfaces of the reflective layer and the recording layer (see FIGS. 3 and 4) and so that the outer peripheral edge of the barrier layer extended outward by 0.5 mm from the outer peripheral edges of the reflective layer and the recording layer. In order to secure the four adhesion regions of the substrate and the cover layer in each of the outer and inner peripheral portions (see FIG. 3), a mask was used in the RF sputtering such that the barrier layer was not formed in the adhesion regions.

Next, a polycarbonate cover layer (Pure Ace, 85 μm thickness, manufactured by Teijin Ltd.) having a tackifier layer with a thickness of 15 μm was bonded onto the barrier layer while the center of the substrate was in the same position as the center of the cover layer. The maximum length, in the radial direction, of each of the adhesion regions in which the cover layer was adhered to the substrate via the tackifier layer in the outer and inner peripheral portions was 0.5 mm. By the process described above, the optical information recording medium of Example 1 was obtained.

Comparative Example 1

The optical information recording medium of Comparative Example 1 was obtained in the same manner as in Example 1 except that the reflective layer was formed such that inner and outer peripheral edges thereof were in the same positions as the corresponding edges of the substrate, respectively, and the barrier layer was formed such that inner and outer peripheral edges thereof were in the same positions as the corresponding edges of the recording layer, respectively.

Comparative Example 2

The optical information recording medium of Comparative Example 2 was obtained in the same manner as in Example 1 except that the maximum length, in the radial direction, of the adhesion region of the substrate and the cover layer was 0.1 mm, and the width of adhesion of the barrier layer and the substrate (difference between the outer peripheral diameter of the barrier layer and the outer peripheral diameter of the reflective layer and the recording layer) was 0.1 mm.

[Evaluation of the Media of Example 1 and Comparative Examples 1 and 2]

A test in which a gum tape was bonded onto and released from the cover layer of the optical information recording medium was conducted. The cover layer was not released from the optical information recording medium in Example 1, but was released from the optical information recording mediums in Comparative Examples 1 and 2.

A test in which the recording medium was left for 120 hours in an atmosphere of 85% RH at 80° C. was conducted, and as a result, the optical information recording medium in Example 1 did not show any particular change in the outward, while the optical information recording medium in Comparative Example 1 showed slight discoloration in the outer peripheral portion.

Example 2

Injection-molded polycarbonate resin substrates having a thickness of 1.1 mm, an outer diameter of 120 mm and an inner diameter of 15 mm and having a spiral groove (track pitch: 340 nm, groove depth: 30 nm, groove width: 150 nm) were prepared, and a reflective layer made of silver having a thickness of 120 nm was formed on the groove surface in an argon atmosphere by DC sputtering with Cube manufactured by Unaxis.

Then, 2 g of dye A represented by the above-described structural formula was dissolved in 100 ml of 2,2,3,3-tetrafluoropropanol to prepare a dye coating solution. The dye coating solution was applied uniformly onto the substrate by spin coating to form a recording layer having a thickness of 100 nm in the groove and a thickness of 70 nm in the land region. Then, the outer peripheral edge portion (length in the radial direction: 0.4 mm) of the recording layer was washed off. Then, the coating layer was annealed in a clean oven at 40° C. for 1 hour. In this annealing, the substrates were supported by a vertical stack pole while spaced apart with a spacer.

After annealing, a barrier layer was formed by RF sputtering ZnS—SiO$_2$ (8:2) at a sputter power of 4 kW at a pressure of $2 \times 10^{-2}$ hPa for 2 seconds such that the thickness thereof was 5 nm. In the sputtering, the barrier layer was formed such that the outer peripheral edge of the barrier layer extended past the outer peripheral edge of the reflective layer by 0.5 mm. In order to secure the four adhesion regions of the substrate and the cover layer in each of the outer and inner peripheral portions (see FIG. 7), a mask was used in the RF sputtering such that the barrier layer was not formed in the adhesion regions.

Next, a polycarbonate cover layer (Pure Ace, 85 μm thickness, manufactured by Teijin Ltd.) having a tackifier layer with a thickness of 15 μm was bonded onto the barrier layer while the center of the substrate was in the same position as the center of the cover layer. The maximum length, in the radial direction, of each of the adhesion regions in which the cover layer was adhered to the substrate via the tackifier layer in the outer and inner peripheral portions, was 0.5 mm. By the process described above, the optical information-recording medium of Example 2 was obtained.

Comparative Example 3

The optical information recording medium of Comparative Example 3 was obtained in the same manner as in Example 2 except that the barrier layer, the recording layer and the reflective layer were formed such that their outer peripheral edges were in the same position.

[Evaluation of the Media of Example 2 and Comparative Example 3]

(1) Release Test

A test in which a gum tape was bonded onto and released from the cover layer of the optical information recording medium was conducted, and the recording medium was evaluated based on the following criteria. The results are shown in Table 1.

[Evaluation Criteria]
◯: The cover layer was not released.
X: The cover layer was released.

(2) Evaluation of Recording Characteristics

Using a disk drive unit (DDU1000, manufactured by Pulstec Industrial Co., Ltd.), pits having a length of 160 nm were formed at a linear velocity of 4.9 m/s, and C/Ns before and after the release test (1) described above were measured. The results are shown in Table 1.

TABLE 1

|  | Release test | C/N (dB) before the test | C/N (dB) after the test |
| --- | --- | --- | --- |
| Example 2 | ◯ | 46 | 45 |
| Comparative Example 3 | X | 46 | 40 |

As can be seen from the results of the release test (1) and the evaluation of recording characteristics (2) shown in Table 1, the optical information recording medium of Example 2 has higher adhesion and higher recording characteristics than the optical information recording medium of Comparative Example 3.

Example 3

Injection-molded polycarbonate resin substrates having a thickness of 1.1 mm, an outer diameter of 120 mm and an inner diameter of 15 mm and having a spiral groove (groove depth: 30 nm, groove width: 150 nm, track pitch: 340 nm) were prepared, and a reflective layer made of silver (100 nm thickness) was formed on the groove surface in an argon atmosphere by DC sputtering.

Then, 2 g of dye A represented by the above-described structural formula was dissolved in 100 ml of 2,2,3,3-tetrafluoropropanol to prepare a dye coating solution. The dye coating solution was applied onto the reflective layer by spin coating under the conditions of 23° C. and 50% RH while number of revolutions per minute was changed from 300 to 4000 rpm. After the coating layer was left at 23° C. under 50% RH for 1 hour, a recording layer (thickness thereof in the groove: 100 nm, thickness thereof in the land region: 70 nm) was formed.

After the recording layer was formed, it was annealed in a clean oven. The annealing treatment was conducted at 40° C. for 1 hour. At this time, the substrates were supported by a vertical stack pole while spaced apart with a spacer.

Thereafter, a cover layer (100 μm thickness, made of polycarbonate) was disposed on the formed recording layer such that the cover layer surface having a central line average roughness (Ra) of 1 μm faced the recording layer. Thereafter, the substrate and the cover layer were bonded to each other by applying ultrasonic waves to regions in the radius ranges of 20 to 21 mm and 59 to 60 mm, respectively, from the center of the cover layer, in order to obtain the optical information recording medium of Example 3. Only these regions of the cover layer were bonded onto the substrate. The ultrasonic fusion was carried out in the following manner. First, an ultrasonic horn was placed on the cover layer, and the adhesion regions were pressed with the ultrasonic horn while the cover layer was given ultrasonic vibration for 3 seconds by the ultrasonic horn, whereby the cover layer itself was fused and cured to complete the adhesion between the cover layer and the substrate.

[Evaluation of Recording Characteristics of the Optical Information Recording Medium of Example 3]

-C/N (Carrier/Noise Ratio)-

A recording/reproduction evaluating machine (DDU 1000, manufactured by Pulstec Industrial Co., Ltd.) containing a 405-nm laser and a pickup having NA of 0.85 was used to form 197-nm pits at a recording power of 5 mW at a linear velocity of 4.9m/s, and the C/N was measured by using a spectral analyzer.

As a result of measurement, the C/N of the optical information recording medium of Example 3 was 48 dB.

Comparative Example 4

The optical information recording medium of Comparative Example 4 was obtained in the same manner as in Example 3 except that a cover layer whose surface abutting the recording layer had a central line average roughness (Ra) of 0.03 μm was used.

The optical information recording medium thus prepared was subjected to the same experiment as in Example 3, to evaluate the recording characteristics. As a result of measurement, the C/N of the optical information recording medium of Comparative Example 4 was 44 dB.

The optical information recording medium of Example 3 according to the invention was superior in recording characteristics to the optical information recording medium of Comparative Example 4.

What is claimed is:

1. A disk-shaped optical information recording medium comprising a substrate, a recording layer, a barrier layer, a tackifier or adhesive layer, and a cover layer, in this order, each of which has a central hole, and where information is recorded to the medium and reproduced from the medium by irradiating laser beams thereon from the cover layer side, wherein the barrier layer covers a surface of the recording layer, and at least one of an outer peripheral end edge surface and an inner peripheral end edge surface of the recording layer; at least one of inner peripheral portions and outer peripheral portions of the substrate and the cover layer adhere to each other in at least partial region thereof via the tackifier or the adhesive layer; and the maximum length of the partial region in the radial direction is 0.4 mm or more.

2. The optical information recording medium of claim 1, further comprising a reflective layer, wherein the cover layer covers at least one of an outer peripheral end edge surface and an inner peripheral end edge surface of the reflective layer.

3. The optical information recording medium of claim 1, wherein said at least one of inner peripheral portions and outer peripheral portions of the substrate and the cover layer adhere to each other in partial regions thereof via the tackifier or adhesive layer.

4. The optical information recording medium of claim 1, wherein said at least one of inner peripheral portions and outer peripheral portions of the substrate and the cover layer adhere to each other in the entire surface or surfaces thereof via the tackifier or adhesive layer.

5. The optical information recording medium of claim 1, wherein the maximum length of the partial region of the outer peripheral portions in the radial direction is 0.4 to 2 mm.

6. The optical information recording medium of claim 1, wherein the maximum length of the partial region of the inner peripheral portions in the radial direction is 0.4 to 15 mm.

7. The optical information recording medium of claim 1, wherein the difference between outer peripheral diameters of the barrier layer and the recording layer is 0.1 to 2 mm.

8. The optical information recording medium of claim 1, wherein the difference between inner peripheral diameters of the barrier layer and the recording layer is 0.1 to 5 mm.

* * * * *